(12) United States Patent
Girolami-Rose et al.

(10) Patent No.: US 7,506,312 B1
(45) Date of Patent: Mar. 17, 2009

(54) METHOD AND SYSTEM FOR AUTOMATICALLY DETERMINING RISK AREAS TO RETEST

(75) Inventors: Laura Lee Girolami-Rose, Raleigh, NC (US); Peter Andrew Nicholls, Janetville (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/024,034

(22) Filed: Jan. 31, 2008

(51) Int. Cl.
*G06F 9/44* (2006.01)
(52) U.S. Cl. .................................. 717/124; 717/101
(58) Field of Classification Search ........................ None
See application file for complete search history.

(56) References Cited

U.S. PATENT DOCUMENTS

| | | | |
|---|---|---|---|
| 6,668,340 B1 * | 12/2003 | Baker et al. ............... | 714/38 |
| 6,880,108 B1 | 4/2005 | Gusler et al. | |
| 6,895,577 B1 * | 5/2005 | Noble et al. ............... | 717/126 |
| 6,912,676 B1 | 6/2005 | Gusler et al. | |
| 6,980,927 B2 | 12/2005 | Tracy et al. | |
| 7,197,427 B2 * | 3/2007 | Noonan et al. ............ | 702/179 |
| 2004/0268308 A1 * | 12/2004 | Srivastava et al. ......... | 717/120 |
| 2005/0283751 A1 | 12/2005 | Bassin et al. | |
| 2006/0173762 A1 | 8/2006 | Clater | |
| 2007/0174702 A1 * | 7/2007 | Meyer ....................... | 714/33 |
| 2007/0239495 A1 | 10/2007 | Osborn et al. | |

\* cited by examiner

*Primary Examiner*—Michael J Yigdall
(74) *Attorney, Agent, or Firm*—MaxValueIP, LLC

(57) ABSTRACT

In software development, risks can be quantified and defined by certain attributes. For instance, a risky area will have a large number of defects/changes for that area, a large number of high severity defects for that area, or a large number of coders/authors for that same area. All these metrics are already captured in Unified Change Management tools, version control tools and bug tracking tools. By taking the appropriate data and associating them with certain triggers and thresholds, an embodiment of the invention automatically identifies which test cases to run for regression. Through historical and previous test data and test runs, an embodiment of the invention forecasts how long it will take to run these regression suites.

1 Claim, 2 Drawing Sheets

METHOD AND SYSTEM FOR AUTOMATICALLY DETERMINING RISK AREAS TO RETEST

BACKGROUND OF THE INVENTION

Examples of the invention include: test automation and test management tools, software development tools, lifecycle, process, and end-to-end development. Risk assessment is an acceptable best practice for determining schedules, level of efforts, and product quality forecasting. In software development, it is desired to perform regression test thoroughly and frequently to reduce risk. These regressions tests can be too large and time consuming to run completely during each iteration of a product's development cycle. Therefore, not everything can be continuously tested and retested. In order to reduce the risk and maximize the number of defect discovered, the test cases run for each iteration need to be selected in order to run the cases with highest probability of failure first. This ordering will thus reduce the overall risk of a defect not found in development iteration. However, the process of ordering test cases is often not done as the tests are usually executed in the same order. If there is any ordering or intelligent selection of tests, the test selection is often manual and not based on the current state of work artifacts. Test passes often end when a time period has passed, and they start all over again with the next build or some other event.

SUMMARY OF THE INVENTION

An embodiment of this invention provides a method for automating both the selection of the test cases and the ordering of the test cases in the test pass. This is done through the analysis of the actual work artifacts against definable selection policies and risk criteria. This selection and ordering causes the test mostly likely to fail to be run first during a test pass and thus increasing the odds of finding problems in a given test pass.

In software development, risks can be quantified and defined by certain attributes. For instance, a risky area will have large number of defects/changes for that area, large number of high severity defects for that area, or large number of coders/authors for that same area.

All the above metrics are already captured in UCM (Unified Change Management tool), version control tool (such as ClearCase®), and bug tracking tool (such as ClearQuest®). By taking the appropriate data and associating with certain triggers and thresholds, an embodiment of the invention can automatically identify which test cases to run for regression. Through historical and previous test data and test runs, an embodiment of the invention also forecasts how long it will take to run these regression suites.

DETAILED DESCRIPTION OF THE PREFERRED EMBODIMENTS

Figure 1:
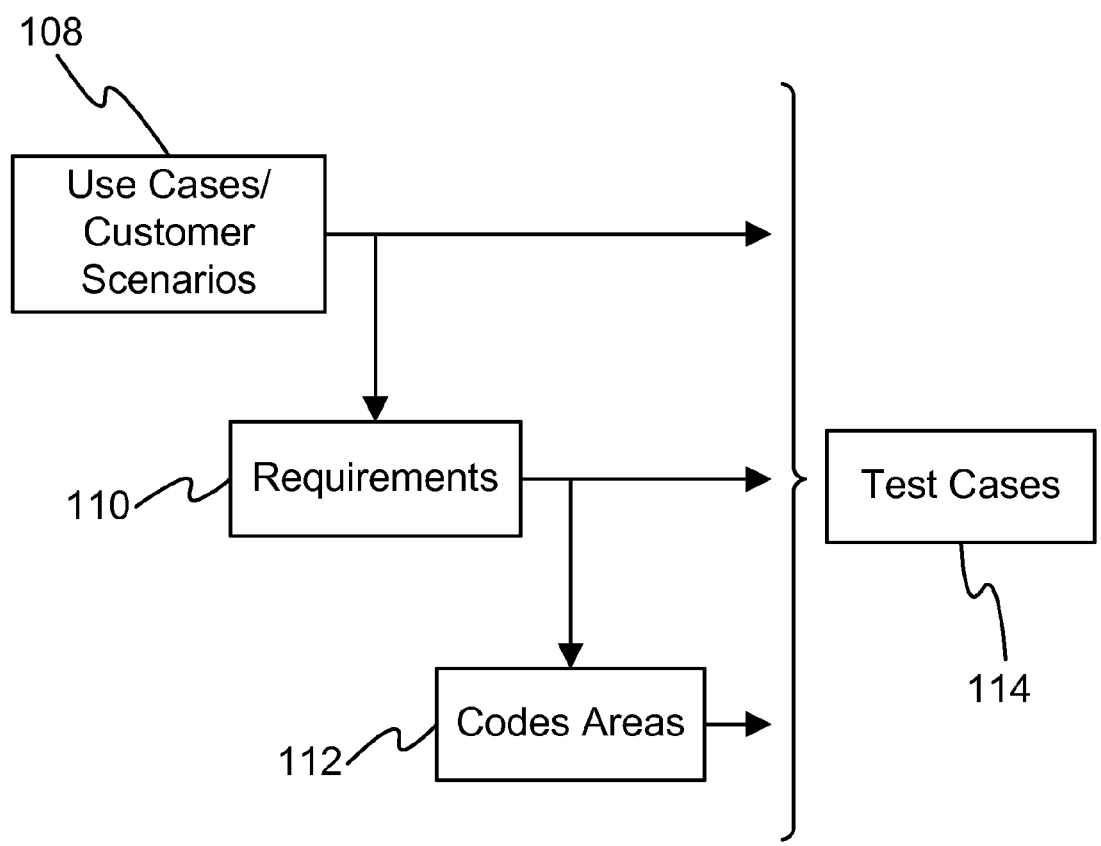
FIG. 1 is a schematic diagram of the typical test management tools.

In software development, risks can be quantified and defined by certain attributes. For instance, a risky area will have:

large number of defects/changes for that area,
large number of high severity defects for that area, or
large number of coders/authors for that same area.

All the above metrics are already captured in UCM, version control tool (such as ClearCase®), and bug tracking tool (such as ClearQuest®). By taking the appropriate data and associating with certain triggers and thresholds, an embodiment of the invention automatically identify which test cases to run for regression. Through historical and previous test data and test runs, an embodiment of the invention also forecasts how long it will take to run these regression suites.

Another important aspect to risk assessment is the risk tolerance (i.e., how much risk is accepted to absorb). To implement these attributes of risk assessment, an embodiment of this invention creates two definitions files:

Risk Definition file: users can define what attributes defines a risk for their project.

Risk Threshold file: users can define the percentage or threshold bar that each risk attribute must pass before the area is considered "an actionable risk".

In an embodiment of the invention, users are provided default files, but they can modify or create their own definition and threshold files.

Typical test management tools (e.g., CQTM (CQTM stands for ClearQuest® Test Manager)) hold test artifacts that associate Use Cases, User Scenarios, Requirements, and other coded components to individual test cases.

Using both the Risk Definition File and the Threshold file, an embodiment of this invention searches the various UCM, version control, and bug tracking applications to gather the data on defect counts per area, number of coders per area, and/or number of defects per "concerned" severity/priority levels. When an area reaches and passes the user defined thresholds, the area/component is flagged as a risk area. All test cases associated with that highlighted components are tagged for regression testing. Any previous test runs associated with those same test cases are collected, aggregated and calculated toward forecasting how long it will take to run this regression suite. Previous rejection counts on this area (i.e. how many times this test had to be rerun before it actually passed) is included in the calculation for a plus or minus range. This allows the use of historical and empirical data to schedule and forecast more accurate level of regression test effort.

An embodiment of the invention will also list the environments and setup needed for the associated test case run.

Risk Definition File

In one embodiment, the quantifiable attributes are defined in a risk definition file. This file contains information that will indicate to the test selection system what criteria will be used to measure risk. In one embodiment, this file is in an extensible format such as XML allowing additional criteria to be added over time.

In an embodiment, the selection policies are based on risk assessment. These risks can be quantified and defined by certain attributes. For instance, a risky area may have:

1. large number of defects/changes for that area
2. large number of high severity defects for that area
3. a large number of coders/authors for that same area
4. an area that has not been tested for a period of time
5. the first version of a requirement
6. inexperienced coder/author
7. developer with a track record of poor quality fixes
8. test usually fails (or conversely test always passes)
9. a very new piece of code One embodiment of the invention determines one or more of above metrics by examining data that is captured in version control tools, requirements tools and other existing software development tools.

Risk Threshold File

In one embodiment of the invention, the threshold or percentage of acceptable risk is defined in a separate file called the Risk Threshold file. This file defines thresholds or tolerances for each attribute that must be exceeded in order to contribute and assign a numeric risk failure score for a test. Tests with higher risk failure scores are ordered to run ahead of tests with lower risk failure scores.

In one embodiment, the definition of a risk thresholds and tolerances varies depending on:
- the industry or culture
- development phase
- the quality acceptance criteria, or
- market trends or delivery cycles In one embodiment, Risk Threshold file enables automatic generation of regression suites on demand based on the changing environments and climate.

In one embodiment, risks from the Risk Definition file are quantified and the thresholds set. These are defined by the users and then iterated over by the quality management system to assign risk failure scores to the tests. For example:
- Code area changes>1, +10
- Code not changed in 1 month, −10
- Defect fixed, +10
- Test passed last time, −10
- Test not run in month, +10
- 1st version of source, +100
- Developer x made change, +50
- Developer y made change, +10
- Test failed last time, +10
- Test failed last 2 times, +50

Risk Policy and scoring

In one embodiment, Risk Definition File and Risk Threshold File together form a test case selection policy. The policy can be persisted, and each development iteration can use different policies to determine the test selection and ordering.
- Risk policy combines risk definition and risk thresholds.
- "Acceptable Risk" differs depending on the industry or culture risk tolerance, development phase, user quality acceptance criteria, and market trends or delivery cycles.
- There may be multiple risk policies.
- Weighting and ordering of tests so that the tests with higher risk failure scores are set to run ahead of those with lower risk failure scores.

In one embodiment, interactive user interface provides for management and viewing of risk policies, test case risk failure scores, and selected and ordered tests.

Referring to FIG. 1, in one embodiment, for a given operation, the test plans identify test cases (114), which represent the ways in which users are likely to use the product. Test scripts are written to meet the requirements (110) for the test cases. The results returned when the test scripts run are evaluated to determine project status, in particular, the progress toward completing the work represented by the next milestone in the project. Typical test management tools (e.g., CQTM) hold test artifacts that associate Use Cases, User Scenarios (108), Requirements (110) and other coded components (112), to individual test cases (114).

Figure 2:
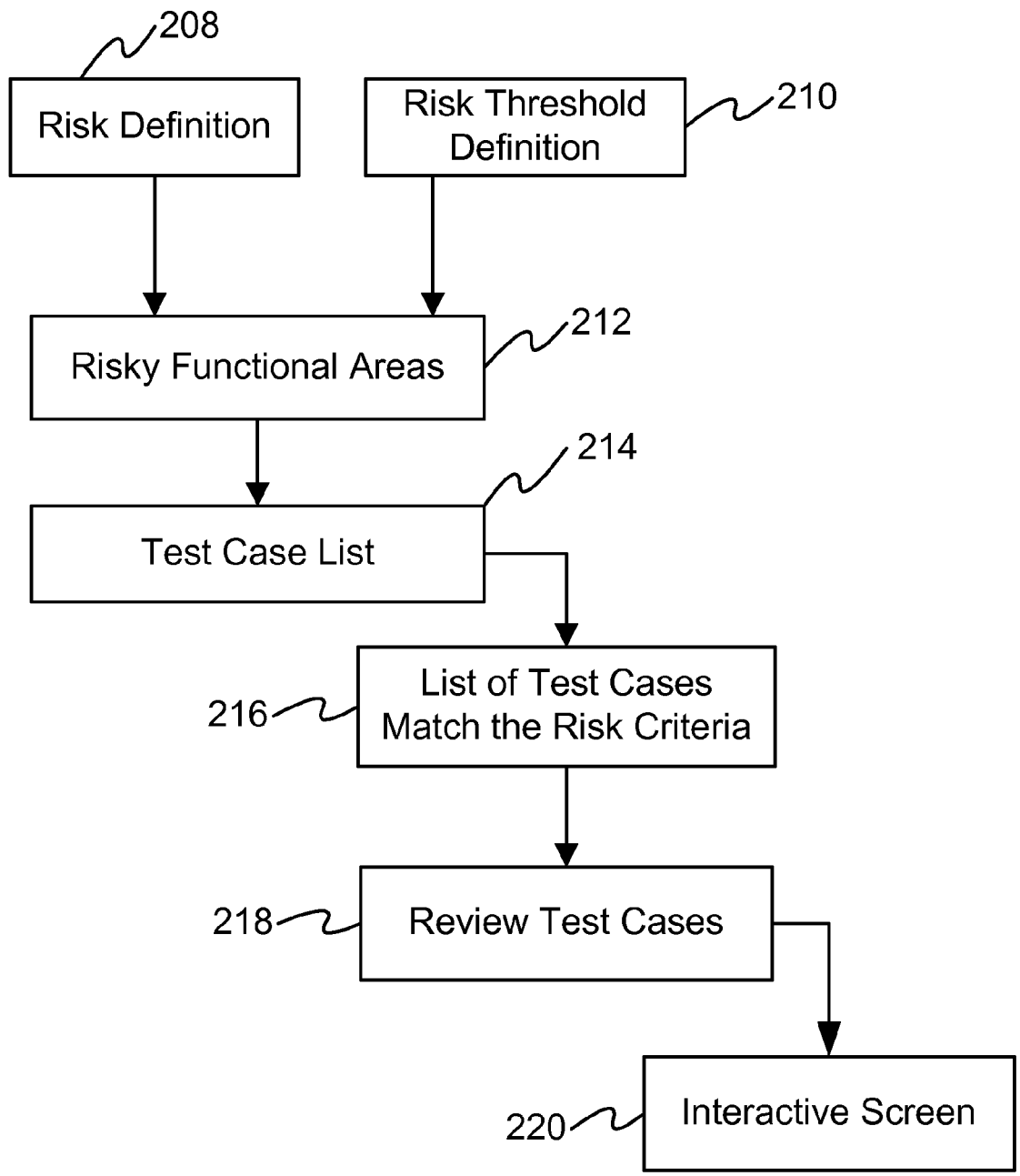
FIG. 2 is a schematic diagram of an embodiment which determines risk areas to retest.

FIG. 2 is a schematic diagram of an embodiment which determines risk areas to retest. In one embodiment, for a given operation in an application, using both the Risk Definition File (208) and the Threshold file (210), based on the risk table definition and thresholds, the UCM or equivalent tool creates a list of "risky functional areas" (212). Based on those functional areas, UCM (or equivalent) creates the test case list (214) from the associated "risk areas", where the list of test cases match the risk criteria (216). Once the test case list is created, an embodiment of invention allow users review the test case list and delete test cases to automatically see risk thresholds change, based on their modifications (218). An embodiment provides an interactive screen view of Risk thresholds based on test cases selected (220).

One embodiment of the invention is a method of automatically determining risk areas to retest directly from work artifacts, the method comprising:
- defining risk failure attributes and criteria in an extensible markup language format for work artifacts in a software development environment;
- assigning risk failure tolerances or thresholds to the risk failure attributes and criteria;
- producing a risk failure policy by combining the risk failure attributes and criteria and the risk failure tolerances or thresholds by a quality management system;
- assigning risk failure scores to test cases;
- selecting and applying the risk failure policy arbitrarily for any test pass;
- automatically selecting the test cases for execution, based on application of the risk failure policy;
- automatically ordering the test cases, based on the risk failure scores per the test pass;
- automatically generating a test suite dynamically, from pool of the test cases, based on application of the risk failure policy;
- filtering and setting constrain test selection, based on a combination of the risk failure attributes and criteria;
- providing reports indicating the risk failure scores for the test cases;
- analyzing the risk failure scores of past test cases and actual test execution result;
- providing a first user-interface to create and modify the risk failure attributes and criteria and the risk failure tolerances or thresholds;
- creating an initial ordered set of the test cases for the quality management system, to reorder, based on the risk failure scores of the past test cases;
- dynamically changing the risk failure scores, based on execution results in the test suite;
- dynamically selecting the test cases, by adding or subtracting the test cases;
- dynamically reordering the test cases; and
- providing a second user-interface to dynamically provide the risk failure scores and actual test results for the test cases during execution.

A system, apparatus, or device comprising one of the following items is an example of the invention: work artifact, risk failure attribute, criteria or policy, software development environment, risk failure tolerance or threshold, a quality management system or software, test case, test suite, report, test result, user-interface, display device, or any software, applying the method mentioned above, for purpose of invitation or for automatically determining risk areas to retest.

Any variations of the above teaching are also intended to be covered by this patent application.

The invention claimed is:

1. A method of automatically determining risk areas to retest directly from work artifacts, said method comprising:
- defining risk failure attributes and criteria in an extensible markup language format for work artifacts in a software development environment;

assigning risk failure tolerances or thresholds to said risk failure attributes and criteria;

a quality management system producing a risk failure policy by combining said risk failure attributes and criteria and said risk failure tolerances or thresholds;

assigning risk failure scores to test cases, based on said risk failure policy;

selecting and applying said risk failure policy to said test cases for a test pass;

automatically selecting said test cases for execution by filtering and setting constraints, based on application of said risk failure policy;

automatically ordering said test cases, based on said risk failure scores per said test pass;

automatically generating a test suite dynamically, from pool of said test cases, based on application of said risk failure policy;

providing reports indicating said risk failure scores for said test cases;

analyzing said risk failure scores of past test cases and actual test execution result;

providing a first user-interface to create and modify said risk failure attributes and criteria and said risk failure tolerances or thresholds;

creating an initial ordered set of said test cases for said quality management system, to reorder, based on said risk failure scores of said past test cases;

dynamically changing said risk failure scores, based on execution results in said test suite;

dynamically selecting said test cases, by adding or subtracting a test case from said test cases via a display device;

dynamically reordering said test cases;

providing a second user-interface to dynamically provide said risk failure scores and actual test results for said test cases during execution; and collecting and aggregating previous test runs associated with said test cases and forecasting a length of time and a range to run said test suite, wherein said forecasting step uses previous test rerun counts on a risk area to schedule and forecast a level of regression test effort.

* * * * *